United States Patent [19]

Kajita

[11] Patent Number: 4,834,200
[45] Date of Patent: May 30, 1989

[54] METHOD AND APPARATUS FOR DYNAMIC WALKING CONTROL OF ROBOT

[75] Inventor: Syuji Kajita, Tsukuba, Japan

[73] Assignees: Agency of Industrial Science & Technology; Ministry of International Trade & Industry, both of Tokyo, Japan

[21] Appl. No.: 132,323

[22] Filed: Dec. 14, 1987

[30] Foreign Application Priority Data

Dec. 15, 1986 [JP] Japan ................................. 61-298306

[51] Int. Cl.$^4$ ............................. B62D 57/02; B25J 5/00
[52] U.S. Cl. ....................................... 180/8.1; 180/8.2; 180/8.6; 901/1
[58] Field of Search ................... 180/8.1, 8.2, 8.5, 8.6; 901/1

[56] References Cited

U.S. PATENT DOCUMENTS 4,662,465 5/1987 Stewart ................................ 180/8.1

FOREIGN PATENT DOCUMENTS

| 113573 | 5/1986 | Japan | 180/8.6 |
| 143266 | 6/1986 | Japan | 180/8.6 |
| 205567 | 9/1986 | Japan | 180/8.6 |
| 257375 | 11/1986 | Japan | 180/8.1 |

*Primary Examiner*—Mitchell J. Hill
*Attorney, Agent, or Firm*—Oblon, Spivak, McClelland, Maier & Neustadt

[57] ABSTRACT

A method and an apparatus for dynamic walking control of a biped robot including a torso and a pair of legs with feet which, having a much smaller mass than the torso, make it possible to consider the robot as an inverted pendulum. The legs are equipped with actuators by which their length can be expanded or contracted and with actuators for producing swinging torque between each leg and its foot. The walking of the robot is controlled by detecting the angle between each leg and foot, adjusting the length of at least the leg whose foot is in contact with the ground so as to control the height of the center of gravity of the torso to pass along a straight line of predetermined inclination, and applying torque to act about the ankle of the foot in contact with the ground.

5 Claims, 4 Drawing Sheets

METHOD AND APPARATUS FOR DYNAMIC WALKING CONTROL OF ROBOT

BACKGROUND OF THE INVENTION

1. Field of the Invention

This invention relates to a method for dynamic walking control of a robot, namely for control of robot walking in which the center of gravity of the robot shifts outside the region of the feet, and more particularly, to dynamic walking control for a biped robot as required for enabling the robot to maneuver stairs and other inclined and/or irregular surfaces.

2. Discussion of the Background

A robot which is capable of dynamic walking is able to move over stairs and other inclined and/or irregular surfaces at high speed and in this respect is advantageous over one whose center of gravity constantly remains within the area defined by the contact of the robot feet with the ground.

In conducting dynamic walk control for such a robot, however, the loci of the robot joints for each step have ordinarily had to be established in detail beforehand as a function of time in accordance with the walking pattern. The control has therefore been complicated because, for example, of the need to use a different equation for calculation every time the inclination of the walking surface changes.

SUMMARY OF THE INVENTION

The object of the invention is to provide a method and apparatus for dynamic control of a robot which enables the robot to walk surely and smoothly on stairs or an inclined surface even when the angle of inclination is changed.

For achieving this object, the invention provides a method for walk control of a robot comprising a torso, legs of a weight sufficiently light to permit the robot as a whole to be considered as an inverted pendulum, means for controlling the height of the center of gravity of the torso, and actuators for producing torque between the legs and feet provided at the leg extremities, which method comprises detecting the angle between each leg and its foot, the attitude of the torso and the like, controlling the height of the center of gravity of the torso to pass along a predetermined straight line and applying torque to act around an ankle portion of the foot in contact with the ground, thereby to control the working motion of the robot.

Since the legs of the robot are much lighter than the torso, the robot can be considered as an inverted pendulum of mass centered on the leg whose foot is in contact with the ground.

As a result, the motion of the center of gravity of the robot torso, which moves along a straight line or the like parallel to the walking surface, can be expressed approximately by a linear equation having the torque about the ankle of the foot in contact with the ground as a control variable. Dynamic walking control of the robot can therefore be easily conducted based on the aforesaid linear equation.

These and other objects and features of this invention will be better understood from the following detailed description made with reference to the drawings.

DESCRIPTION OF THE PREFERRED EMBODIMENTS

The principle of the invention will first be explained with reference to FIG. 1.

In a dynamic walking robot, where the mass of the legs 2 is very small relative to the mass m of torso 1, the robot can be considered to be an inverted pendulum having legs of zero mass and capable of swinging freely about the ground-contact point (an ankle) 0. The leg 2 of the robot is expandable and contractible so as to vary the length r. The factors controlling the leg length r and the pendulum angle $\theta$ are the ankle torque (swinging torque) u and the expansion/contraction force Fr operating to increase or decrease the leg length.

Figure 1:
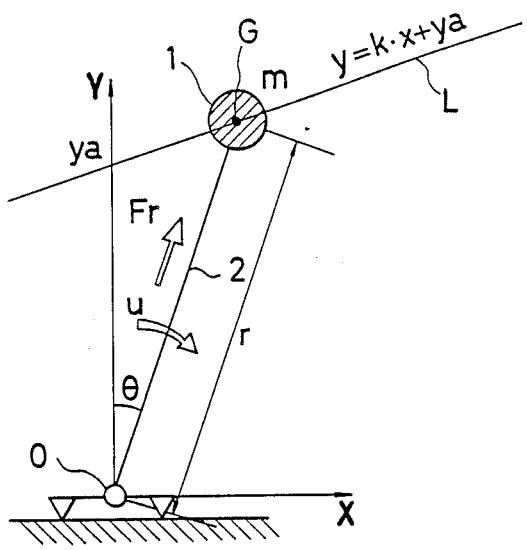
FIGS. 1 and 2 are views for explaining the operating principle of the invention.

If the expansion/contraction force Fr is controlled in order to adjust the leg length r such that the center of gravity G of the pendulum constantly remains on an arbitrarily chosen straight line L ($y = k \cdot x + y_0$) in an X-Y coordinate system as shown in FIG. 1, then the motion of the mass m along the X-axis can be expressed by $$\ddot{x} = (g/y_0) \cdot x + (1/m \cdot y_0) \cdot u \qquad (1)$$

where g is the gravitational acceleration.

The parameter k in the equation defining the straight line L represents the inclination of the surface over which the robot is walking, so that it suffices to vary k in accordance with the angle of inclination of the slope or stairs which the robot is maneuvering. Since even if the ankle torque u becomes zero the mass m is always maintained on the straight line L by increase of the leg length r, the motion of the robot in the X-direction will invariably be as defined by the equation (1) irrespective of the value of the parameter k indicating the inclination.

A brief explanation will now be given of the principle of walking velocity control in the case where the relationship of equation (1) holds. The ankle torque u is presumed to be zero, whereby the robot motion equation becomes $$\ddot{x} = (g/y_0) \cdot x \qquad (2)$$

Figure 2A:
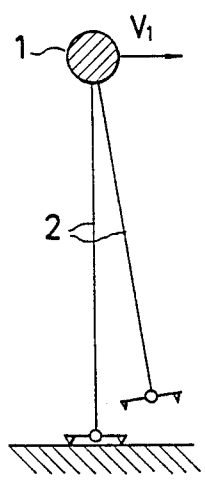
Figure 2B:
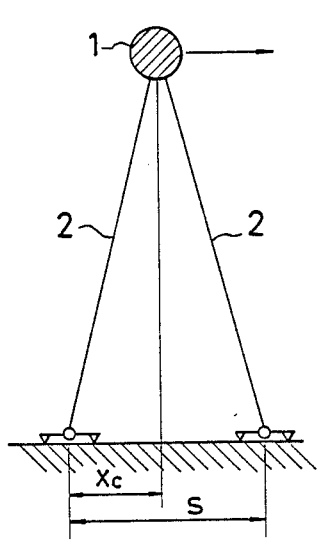
Figure 2C:
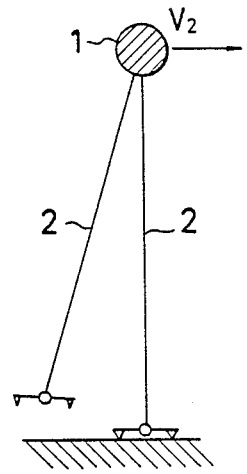

With the robot traveling over a horizontal surface (k=0), the motion from immediately before to immediately after shifting from one leg to the other is as illustrated in FIGS. 2(A)–2(C). Here V1 and V2 indicate the velocity at the instants that the center of gravity of the robot is directly above the ground-contact point. The change in velocity between V1 and V2 depends on the state of the robot at the instant of FIG. 2(A) when support is transferred from one leg to the other. In FIG. 2(B), the symbol s indicates the stride or distance between the ground-contact points of the two legs, and Xc indicates the position of the center of gravity at this instant. When the robot moves in accordance with the stride or equation (2), the following relationship holds among V1, V2, s and Xc.

$$Xc = [g/y_0(V2^2 - V1^2) + s^2]/2s \quad (3)$$

Thus, since the present robot velocity V1 is known, then where the stride is s and the next target velocity is V2, it suffices to shift from one leg to the other in accordance with the value of Xc obtained by calculation from equation (3).

As shown in the foregoing, it is possible to carry out walking control with an angle ankle torque u of zero. Where more precise control of the walking velocity is desired, however, ankle torque is applied.

The walking control according to the present invention will now be explained with reference to the biped robot shown in FIGS. 3 and 4.

The illustrated robot is constructed to satisfy the following conditions.

(1) The legs are constituted so as to be capable of raising and lowering the torso.

(2) The legs are much lighter than the torso.

(3) The ankle portions are constituted such that torque can be applied about the pitch shaft.

(4) An appropriate means is provided for left/right stability during walking so that there is no or almost no lateral sway.

In the illustrated robot, a torso 1 is supported on a pair of legs 2 via hip actuators 5 and each leg 2 has a foot 4 supported via an ankle at the lower extremity thereof so as to be rotatable with respect thereto. Each leg 2 is further provided with an expansion/contraction actuator 3 so as to fulfill the aforesaid condition (1) that raising and lowering of the torso must be possible.

The hip actuators 5 and the expansion/contraction actuators 3 are provided with subordinate control devices (not shown) for promptly adjusting the leg rotation angle $\theta 2$ and the leg length r to target values when so commanded from the outside.

Condition (3) mentioned above is fulfilled by providing ankle actuators 6 for driving each foot 4 to swing about an ankle 0 with respect to the associated leg 2. 2 producing swinging torque between each foot 4 and the associated leg 2. The actuators 6 are constituted such that the torque produced thereby can be regulated.

For fulfilling the aforesaid condition (2) that the legs weigh much less than the torso, it is necessary to keep the mass of the legs to within say about 30% of the mass of the torso. The smaller the ratio of the mass of the legs to the mass of the torso, the closer the movement of the center of gravity of the robot approximates that expressed by the equation (1).

Figure 3:
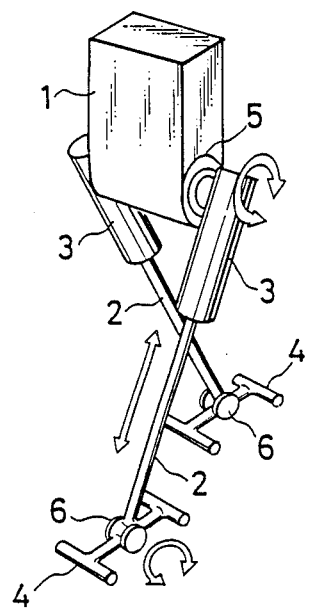
FIG. 3 is a perspective view showing an example of robot walking control according to the invention.
Figure 4:
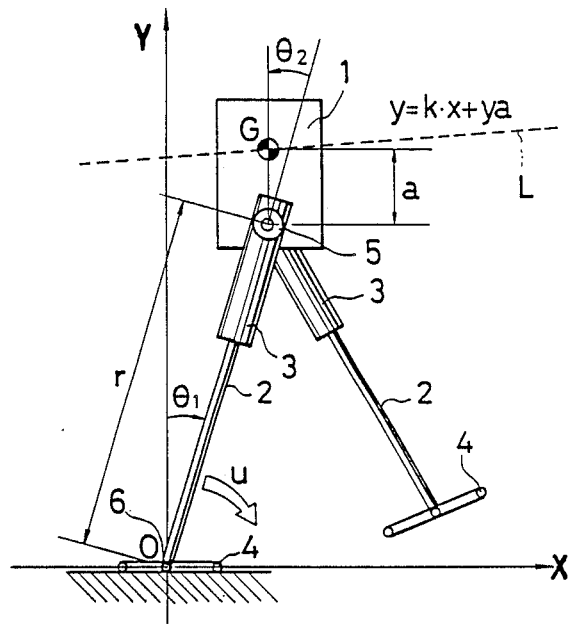
FIG. 4 is a side view of the robot of FIG. 3.

In the case of the robot shown in FIG. 3, the condition (4) regarding lateral stability is met by giving the feet 4 large lateral width so as to prevent the robot from falling sideways when it stands upright. This arrangement prevents lateral swaying during walking.

In the aforesaid robot, taking the center of rotation 0 of the ankle as the origin of an X-Y coordinate system, for each leg the expansion/contraction actuator 3 and the hip actuator 5 are controlled such that, during the period of that the robot is walking on that leg, the torso 1 does not rotate and its center of gravity G remains positioned on the straight line $y = k \cdot x + y_0$. As a result, smooth walking can be realized even on an inclined surface or stairs. More specifically, the hip actuator 5 is rotated such that the center of gravity G of the torso 1 is always directly above the actuator 5 (i.e. such that the torso 1 maintains a vertical attitude). Simultaneously with this, the angle $\theta 1$ between the leg 2 and the Y-axis is measured and the desired leg length r is calculated according to equation (4), whereafter the expansion/contraction actuator 3 is driven to adjust the length of the leg 2 to the calculated value r. In equation (4) the symbol a indicates the distance between the center of gravity G of the torso 1 and the hip actuator 5.

$$r = (y_0 - a)/(\cos \theta 1 - k \cdot \sin \theta 1) \quad (4)$$

Figure 5:
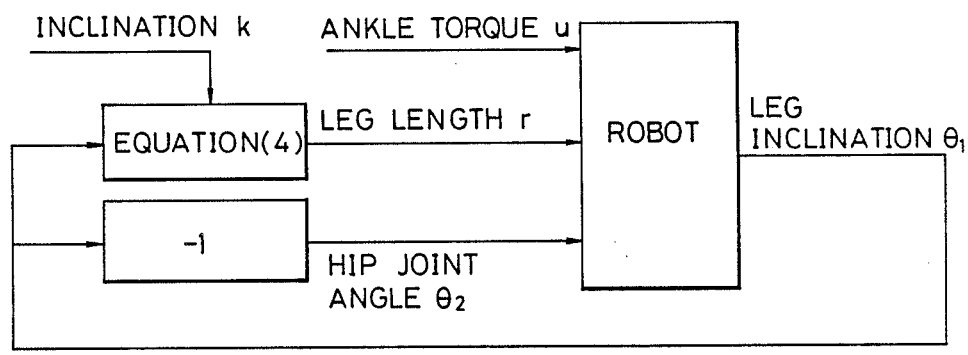
FIG. 5 is a block diagram showing the method of robot control according to the invention.

FIG. 5 is a block diagram of the aforesaid control method. The preferable leg length r and hip joint angle $\theta 2$ are calculated from the leg inclination angle $\theta 1$ and the inclination k, and the results are input to the robot's subordinate control devices. As a result, in the illustrated embodiment, the length of the left leg 2 is increased, whereby the center of gravity G of the torso 1 is maintained on the straight line L ($y = k \cdot x + y_0$).

In this case, since the weight of the leg 2 is small in comparison with that of the torso 1, the motion of the center of gravity G in the direction of the X-axis approximates that expressed by equation (1).

The equation (1) defining the motion of the center of gravity in direction of the X-axis is very simple, which facilitates walking control and enables the walking velocity to be controlled within prescribed limits.

When the robot walks on an inclined surface or stairs, while it suffices to change the inclination k of the straight line in accordance with the inclination of the walking surface, the motion of the robot along the X-axis will be as defined in equation (1) irrespective of any change in the value of k.

Figure 6:
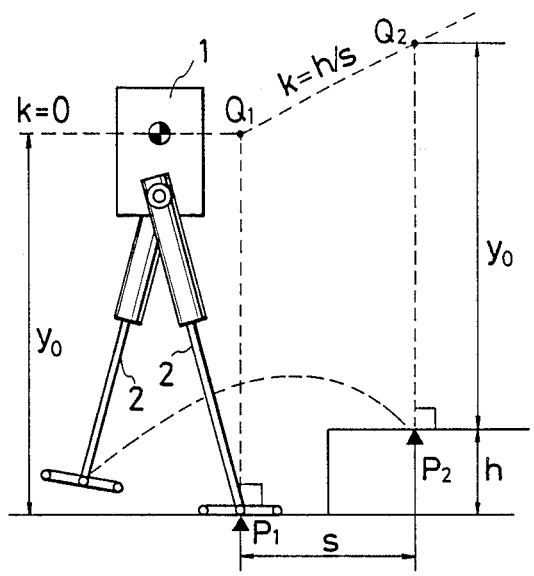
FIG. 6 is a view for explaining the robot control method of the invention.

The value of k can, for example, be determined as follows. Presume that in the course of walking across a horizontal surface the robot comes to a step as shown in FIG. 6. Define the current ground-contact point as P1 and the desired succeeding ground-contact point as P2. If verticals are drawn from points P1 and P2 to a height of $y_0$ and the upper extremities of the verticals are called Q1, Q2, respectively, it will then be possible for the robot to ascend the step if it is controlled such that its center of gravity passes along the line $\overline{Q1Q2}$. If the horizontal distance between P1 and P2 is defined as s and the difference in height between the two points is defined as h, it holds that $k = h/s$. That is to say, $k = 0$ until the center of gravity for the robot reaches Q1 (horizontal motion), and $k = h/s$ for the interval between point Q1 and point Q2. If additional steps follow, $k = h/s$ is maintained, while if there is only one step, $k = 0$ is restored following point Q2. As the locus of the center of gravity is determined solely by the position of the ground-contact point, it is possible to achieve walking on descending stairs, on an inclined surface or over ground with irregular undulations, simply by progressively varying the value of k. As is clear from the foregoing, the walking surface whose inclination is represented by k may be a flat, stepped or an irregularly undulating surface. In the case of an irregular surface, k represents a mean surface derived from the irregular surface, while the control reference line having the inclination k is a line parallel to the mean surface.

Figure 7A:
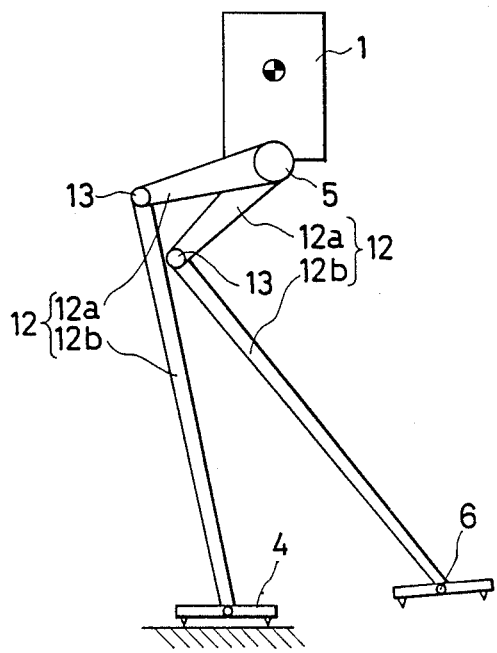
FIGS. 7(A) and (B) are views for explaining another example of the robot control method of the invention.
Figure 7B:
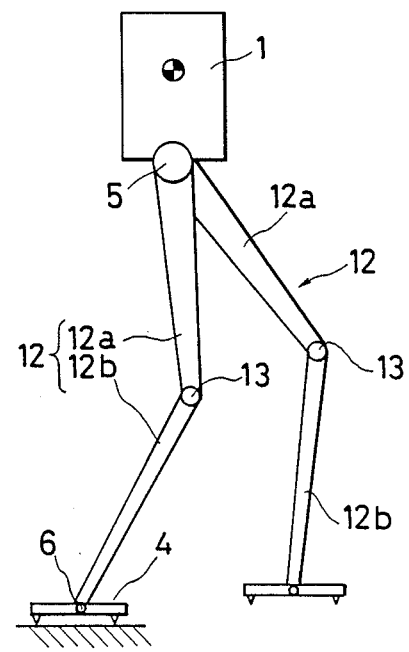

The aforesaid robot may assume any of various forms. As illustrated in FIGS. 7(A) and 7(B), the robot may have legs 12 which are formed of upper and lower leg sections 12a, 12b linked by actuators 13 for enabling adjustment of the height of the center of gravity.

In accordance with the walking control method of this invention, the dynamic movement of a robot in which the center of gravity of the robot torso progresses along a prescribed straight line in the direction of walking can be controlled by calculation in accordance with a simple equation. Moreover, since this control is not affected even when the angle of inclination changes as during walking on an inclined surface or stairs, the walking control can be carried out with exceeding ease.

Obviously, numerous modifications and variations of the present invention are possible in light of the above teachings. It is therefore to be understood that within the scope of the appended claims, the invention may be practiced otherwise than as specifically described herein.

What is claimed is:

1. A method for controlling dynamic walking of a robot having a torso, a pair of expandable and contractible walking leg means for supporting said torso, said leg means having a weight sufficient to permit the robot as a whole to function as an inverted pendulum, wherein each of said leg means comprises a leg, an ankle formed on the lower extremity of said leg and a foot rotatably supported on said leg via said ankle, means for controlling a height dimension of a center of gravity of the torso, and actuator means for producing swinging torque between the leg and the foot of each of said leg means, said method comprising the steps of:
    detecting an angle between the foot in contact with a surface on which the robot walks and an associated leg,
    adjusting a length dimension of the leg associated with the foot in contact with said surface so as to control the height of the center of gravity of the torso to pass along a straight line parallel to said surface, and
    applying torque to act about the ankle associated with the foot in contact with said surface, thereby controlling the walking motion of the robot.

2. A method according to claim 1, further comprising the step of controlling an attitude angle of said torso which is taken simultaneously with the step of adjusting the length dimension of the leg.

3. A robot provided with a dynamic walking control apparatus, comprising:
    a torso,
    a pair of expandable and contractible walking leg means for supporting said torso, said leg means having a weight sufficient to permit the robot as whole to function as an inverted pendulum, wherein each of said leg means comprises a leg, an ankle formed on a lower extremity of said leg and a foot rotatably supported on said leg via said ankle,
    actuator means for producing swinging torque between the leg and an associated foot,
    means for detecting an angle between the foot in contact with a surface on which the robot walks and an associated leg,
    means for adjusting a length dimension of the leg associated with a foot in contact with said surface in accordance with an angle detected by said angle detecting means so as to control a height dimension of the center of gravity of said torso to pass along a straight line parallel to said surface, and
    means for controlling application of the swinging torque produced between the leg and an associated foot by said actuator means.

4. A robot according to claim 3, wherein the mass of said pair of leg means is less than about 30% of the mass of said torso.

5. A robot according to claim 3, which comprises hip activator means by which said pair of leg means support said torso.

* * * * *